United States Patent
Lam et al.

(10) Patent No.: US 7,924,181 B1
(45) Date of Patent: Apr. 12, 2011

(54) SYSTEM, METHOD, AND COMPUTER PROGRAM PRODUCT FOR DIGITALLY ESTIMATING A CLOCK SIGNAL ASSOCIATED WITH AN AUDIO SIGNAL

(75) Inventors: Bruce H. Lam, San Jose, CA (US); Douglas E. Solomon, Los Altos, CA (US); Rohit Kumar Gupta, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1124 days.

(21) Appl. No.: 11/551,557

(22) Filed: Oct. 20, 2006

(51) Int. Cl.
*H03M 7/12* (2006.01)

(52) U.S. Cl. .......................................... 341/70; 370/516

(58) Field of Classification Search ...................... 341/70, 341/50; 375/371; 370/516; 710/29
See application file for complete search history.

(56) References Cited

U.S. PATENT DOCUMENTS

| | | | | |
|---|---|---|---|---|
| 5,668,841 | A  * | 9/1997 | Haskell et al. ................. | 375/371 |
| 6,661,810 | B1 * | 12/2003 | Skelly et al. .................. | 370/516 |
| 7,443,221 | B2 * | 10/2008 | Iler ............................... | 327/291 |
| 7,499,462 | B2 * | 3/2009 | MacMullan et al. .......... | 370/401 |
| 2005/0021885 | A1 * | 1/2005 | Anderson et al. ............... | 710/29 |
| 2007/0047638 | A1 | 3/2007 | Lam et al. ....................... | 375/239 |

* cited by examiner

*Primary Examiner* — Joseph Lauture
(74) *Attorney, Agent, or Firm* — Zilka-Kotab, PC (57) ABSTRACT

A system, method, and computer program product are provided for estimating a clock signal. Specifically, during use, a clock signal associated with an audio signal is digitally estimated.

18 Claims, 7 Drawing Sheets

SYSTEM, METHOD, AND COMPUTER PROGRAM PRODUCT FOR DIGITALLY ESTIMATING A CLOCK SIGNAL ASSOCIATED WITH AN AUDIO SIGNAL

FIELD OF THE INVENTION

The present invention relates to processing audio signals, and more particularly to encoding audio signals.

BACKGROUND

Figure 1:
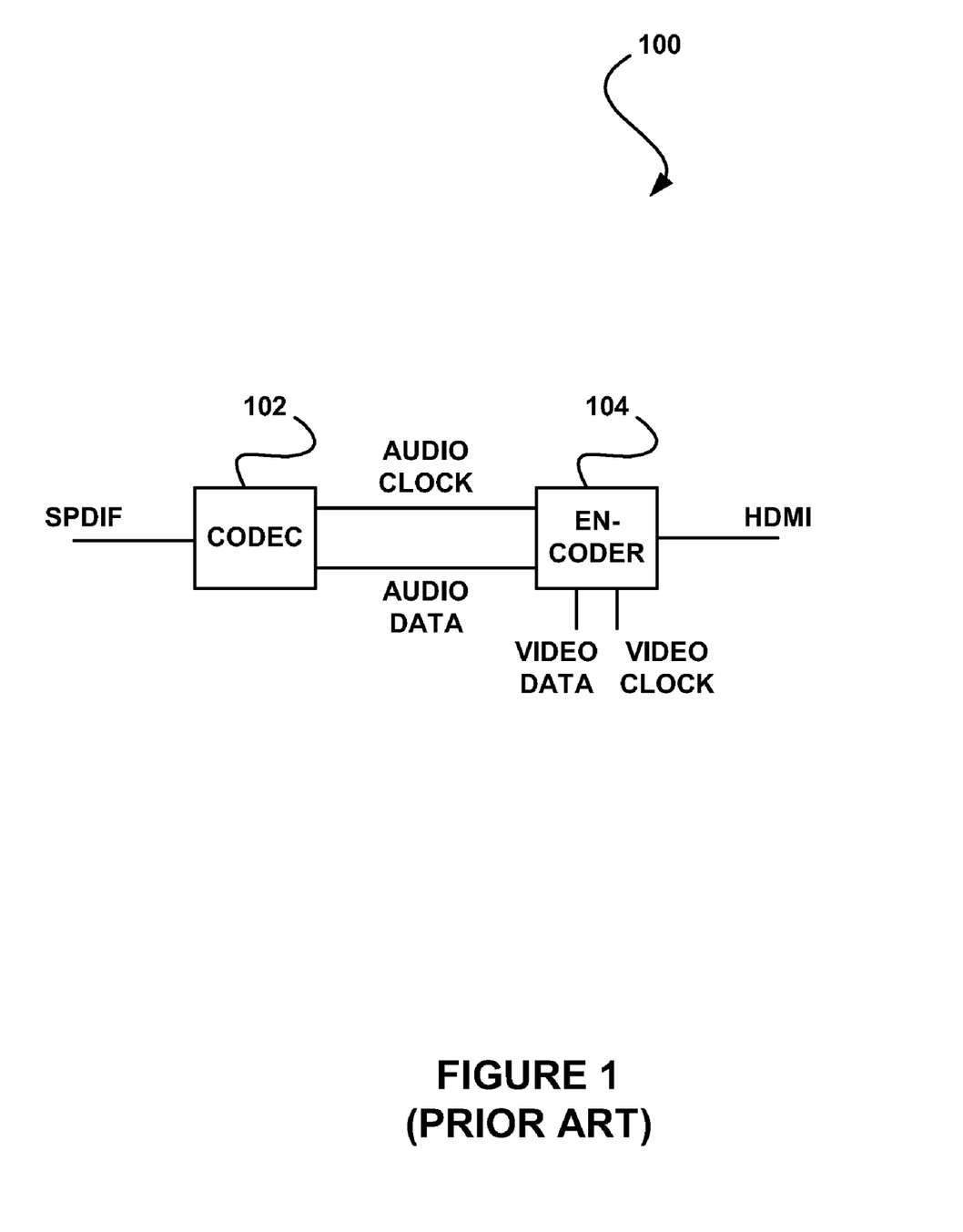
FIG. 1 illustrates a system for encoding an audio signal/video signal, in accordance with the prior art.

Prior art FIG. 1 illustrates a system 100 for encoding an audio signal/video signal, in accordance with the prior art. As shown, included is a coder-decoder (codec) 102 coupled to an encoder 104. In use, an audio signal [e.g. Sony/Philips digital interface (S/PDIF) signal, etc.] is received by the codec 102 which, in turn, decodes the same in the form of an audio clock signal and an audio data signal.

Such signals are received by the encoder 104 in addition to a video clock signal and a video data signal. While not shown, such video data/clock signals are typically received by way of a graphics processor which resides together with the codec 102 and the encoder 104 on a board together. As shown, the encoder 104 serves to identify a relationship between the audio clock signal and video clock signal for the purpose of encoding the audio/video signals into an output signal [e.g. a high definition multimedia interface (HDMI) signal, etc.].

To date, the extraction of the audio clock signal has been necessary for generating the encoded output signal. This requirement has necessitated the use of the aforementioned codec 102, and the cost associated therewith.

SUMMARY

A system, method, and computer program product are provided for estimating a clock signal. Specifically, during use, a clock signal associated with an audio signal is digitally estimated.

BRIEF DESCRIPTION OF THE DRAWINGS

Prior art

DETAILED DESCRIPTION

Figure 2:
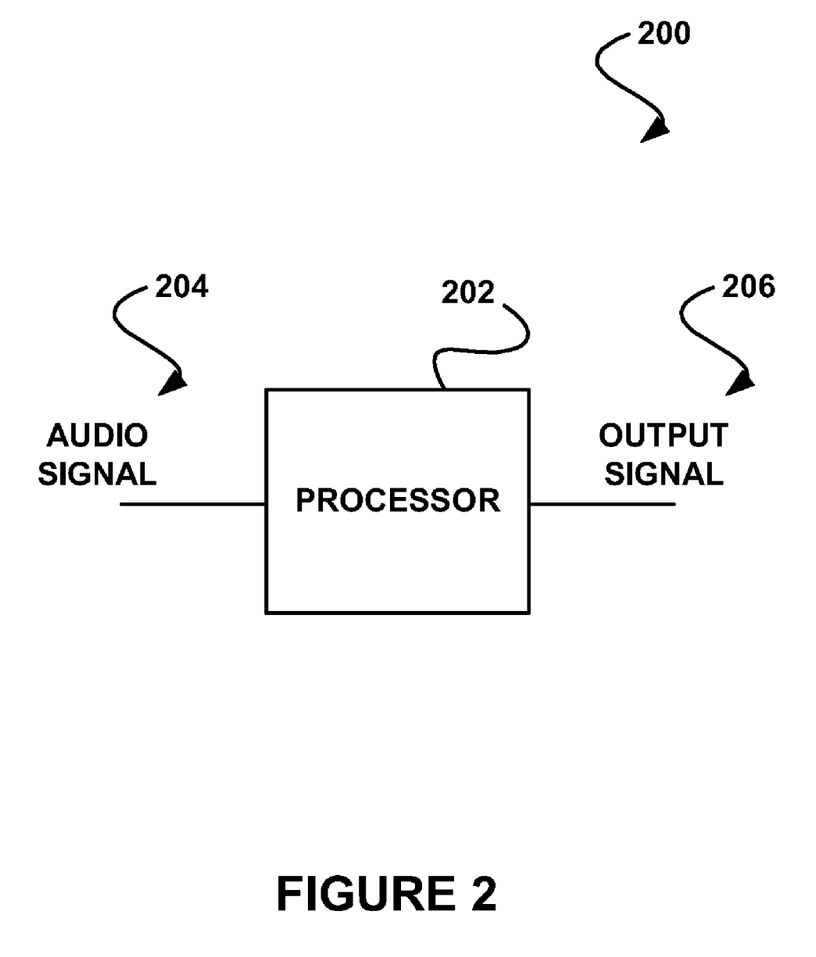
FIG. 2 shows a system for decoding/encoding an audio signal, in accordance with one embodiment.

FIG. 2 shows a system 200 for decoding/encoding an audio signal, in accordance with one embodiment. As shown, included is a processor 202 that receives an audio signal 204. In one embodiment, the processor 202 may take the form of a graphics processor or even an integrated graphics processor unit (GPU). In other embodiments, the processor 202 may include a central processor, or one or more circuits of any type, for that matter.

Further, in one exemplary embodiment, the audio signal 204 may include a Sony/Philips digital interface (S/PDIF) signal or other type of biphase signal (e.g. biphase mark code, etc.). In use, such S/PDIF signal may be capable of transferring audio from one location to another without conversion to and from an analog format, which could degrade the signal quality. In other embodiments, the features disclosed herein or similar techniques may be used in conjunction with a different audio signal 204 such as an audio engineering society/European broadcasting union (AES/EBU) signal, a Toshiba link (TOSLINK), or any other signal that is capable of carrying audio.

In use, the processor 202 is capable of incorporating the audio signal 204 with a video signal (not shown) in order to provide one or more output signals 206. In one embodiment, the output signal(s) 206 may include a high definition multimedia interface (HDMI) signal. In other embodiments, the output signal(s) 206 may include any signal that is capable of carrying audio and video, for that matter.

In one embodiment, the processor 202 may be capable of generating the output signal(s) 206 without necessarily using a codec. In such optional embodiment, a clock signal associated with the audio signal 204 may be digitally estimated. In one embodiment, this may be accomplished utilizing another clock signal (e.g. associated with the processor 202, etc.). To this end, extraction of a clock signal from the audio signal may be optionally avoided, in various embodiments. More information regarding another embodiment that may optionally incorporate the foregoing clock estimation feature will be set forth in greater detail hereinafter during reference to FIG. 5.

Using such digitally estimated clock signal, the audio signal 204 may be encoded in the output signal(s) 206. In one particular embodiment, this may be accomplished by generating an HDMI cycle time stamp (CTS) signal which, in turn, is used to encode the video and audio into the output signal(s) 206.

In various embodiments, the aforementioned absence of a full codec may optionally be addressed in various ways. For example, in one embodiment, the audio signal 204 may be decoded by identifying a first pulse with a predetermined relative duration with respect to a second pulse. A sampling frequency may then be calculated based on the identification.

In one optional embodiment, the predetermined relative duration may include a predetermined ratio with respect to a first duration of the first pulse and a second duration of the second pulse. As an option, the foregoing identification process may be carried out within a predetermined amount of error. As a further option, the predetermined amount of error may be programmable.

By this feature, a preamble associated with the audio signal 204 may thus be identified. In the context of a S/PDIF audio signal, the preamble may refer to a B or M preamble for indicating the start of a subsequent data string associated with the audio signal, synchronization purposes, etc. In any case, such preamble may be identified for use in calculating a sampling frequency (fs) associated with the audio signal 204. More information regarding another embodiment that may optionally incorporate the foregoing preamble identification feature will be set forth in greater detail hereinafter during reference to FIG. 6.

In various embodiments, the audio signal 204 may be decoded utilizing the calculated sampling frequency fs in any desired manner. In one embodiment, the audio signal 204 may be decoded utilizing a threshold. As an option, such threshold may be determined based on the calculated sampling frequency. Thus, pulses may thus be identified as a logic "0" or a logic "1" based on the threshold.

In still yet another embodiment, a decoder may be provided for decoding the audio signal 204 utilizing a clock that is independent of the audio signal. For example, the clock may be received from an entity separate from the signal (e.g. graphics processor 202, a CPU, or any other clock source, for that matter). Additional information regarding another embodiment that may optionally incorporate the foregoing decoding feature will be set forth in greater detail hereinafter during reference to FIG. 6.

More illustrative information will now be set forth regarding various optional architectures and functionality of different embodiments in which the foregoing system 200 may or may not be used, per the desires of the user. It should be strongly noted that the following information is set forth for illustrative purposes and should not be construed as limiting in any manner. Any of the following features may be optionally incorporated with or without the exclusion of other features described.

Figure 3:
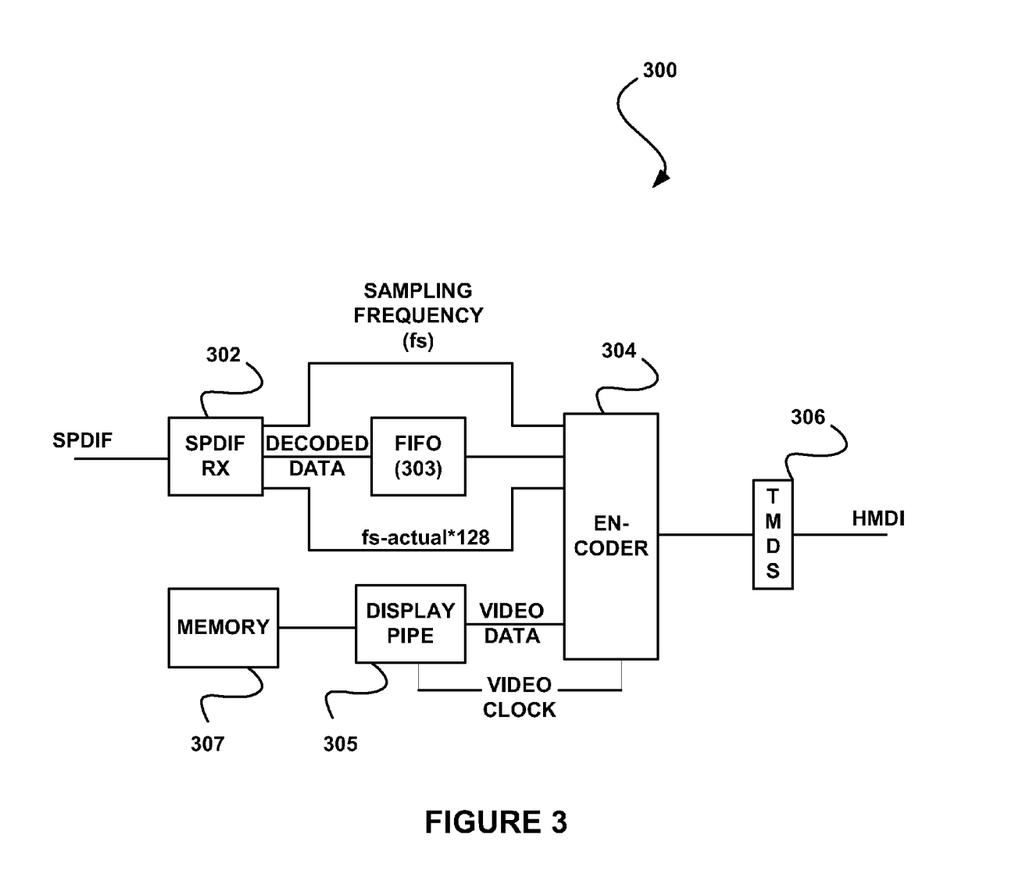
FIG. 3 shows a system for decoding/encoding an audio signal, in accordance with another embodiment.

FIG. 3 shows a system 300 for decoding/encoding an audio signal, in accordance with another embodiment. As an option, the system 300 may be implemented in the context of the system 200 of FIG. 2. For example, one or more of the components of FIG. 3 may be integrated with the system 200, etc. Of course, however, the system 300 may be used in any desired environment (e.g. as a separate component(s), etc.). Again, the aforementioned definitions may equally apply to the description below.

As shown, included is an audio signal (S/PDIF) receiver 302 for receiving an audio (S/PDIF) signal. While a S/PDIF receiver and signal are illustrated in the present system 300, it should be noted that use of other protocols is contemplated. In use, the receiver 302 serves to identify a sampling frequency fs as well as determining another frequency, namely fs-actual*128, for reasons that will soon become apparent. Further, the receiver 302 is adapted to decode the audio signal to generate decoded data.

More information regarding an exemplary embodiment that generates the fs-actual*128 frequency will be set forth in greater detail hereinafter during reference to FIG. 5. Further, more information regarding an exemplary embodiment that generates fs as well as decode the audio signal will be set forth in greater detail hereinafter during reference to FIG. 6.

Further shown is a first-in-first-out (FIFO) buffer 303 for buffering the decoded data. Still yet, an encoder 304 is provided for receiving the foregoing information from the FIFO buffer 303 and receiver 302 for the purpose of encoding the decoded audio signal data in conjunction with video data. In one embodiment, the video data may be processed by/received from a graphics processor (e.g. a graphics pipeline 305 and associated memory 307, etc.), or any other source for that matter. For reasons that will soon become apparent, the receiver 302 and even the FIFO buffer 303 may operate as a function of a first clock (e.g. a clock associated with a graphics processor, etc.), while the encoder 304, etc. may operate as a function of the illustrated video clock ($f_{TMDS\text{-}clock}$).

To facilitate the aforementioned encoding, the encoder 304 calculates or at least estimates a CTS signal. Such CTS signal may be used by downstream systems (e.g. displays, etc.) for decoding the output signal. To this end, the CTS signal may be fed with the encoded data to a transition minimized differential signaling (TMDS) module 306 for providing an output signal (e.g. HMDI signal, etc.).

While the aforementioned CTS signal may typically be calculated utilizing a clock signal associated with the audio signal and a clock signal associated with the video signal, it may, in one embodiment, be calculated in the following manner set forth in Equations #1-2 below. Such equations may be of particular use in an embodiment where the clock associated with the audio signal is unknown due to the use of the receiver 302 instead of a full codec. Of course, it should be noted that the equations below are set forth for illustrative purposes only and should not be construed as limiting in any manner.

$$\text{Ave. } CTS'=(f_{TMDS\text{-}clock}*N)/(128*f_{s}\text{-actual}) \qquad \text{Equation \#1}$$

In use, N is first calculated by utilizing Equation #1, where 128*fs-actual represents an estimated clock signal associated with the audio signal. See FIG. 5, for example. With N now known, the 128*fs-actual frequency is substituted with the 128*fs frequency in Equation #2. In one embodiment, 128*fs may be calculated using the method 600 of FIG. 6.

$$\text{Ave. } CTS'=(f_{TMDS\text{-}clock}*N)/(128*f_{s}) \qquad \text{Equation \#2}$$

Since 128*fs may vary, an average of the estimated CTS' is used by the encoder 304. For example, a new running average may be calculated each time the estimated CTS' is calculated for incorporation into the HDMI output signal.

Figure 4:
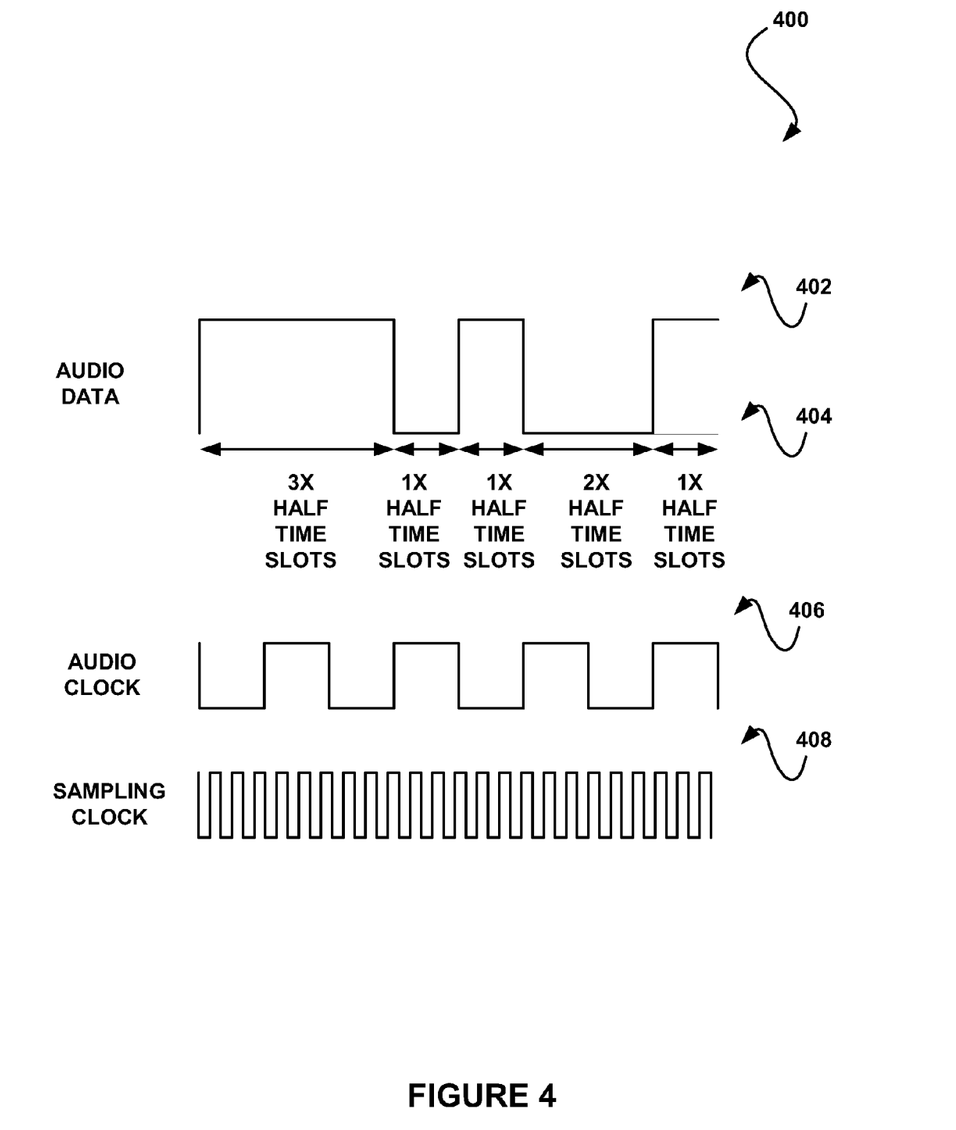
FIG. 4 shows an exemplary audio data signal and independent clock signal, in accordance with one embodiment.

FIG. 4 shows an exemplary audio signal 400, in accordance with one embodiment. As shown, the audio signal 400 includes a plurality of pulse edges 402. In accordance with one possible protocol (e.g. S/PDIF, etc.), a pulse edge within a predetermined timeframe may indicate a logic "1," the absence of a pulse within the predetermined timeframe may indicate a logic "0," and a predetermined ratio (e.g. 3-to-1, etc.) between a first duration of a first pulse and a second duration of second subsequent pulse may be indicate a preamble.

Further illustrated is an inherent audio clock signal 406 that governs the rate of the audio signal 400. As shown, in one embodiment, the audio clock signal 406 defines "half time slots," in the manner shown.

As will soon become apparent, a sampling clock 408 that runs faster than the audio clock signal 406 may be used to sample the audio signal 400. As shown, in one embodiment, the sampling clock 406 may sample the audio signal 400 multiple times (e.g. 10, 20, 50, 100, etc.) for each cycle of the audio clock signal 406. More information will now be set forth regarding the manner such sampling clock 408 may be used for digitally estimating a clock signal associated with the audio signal 400, as well as decoding the same.

Figure 5:
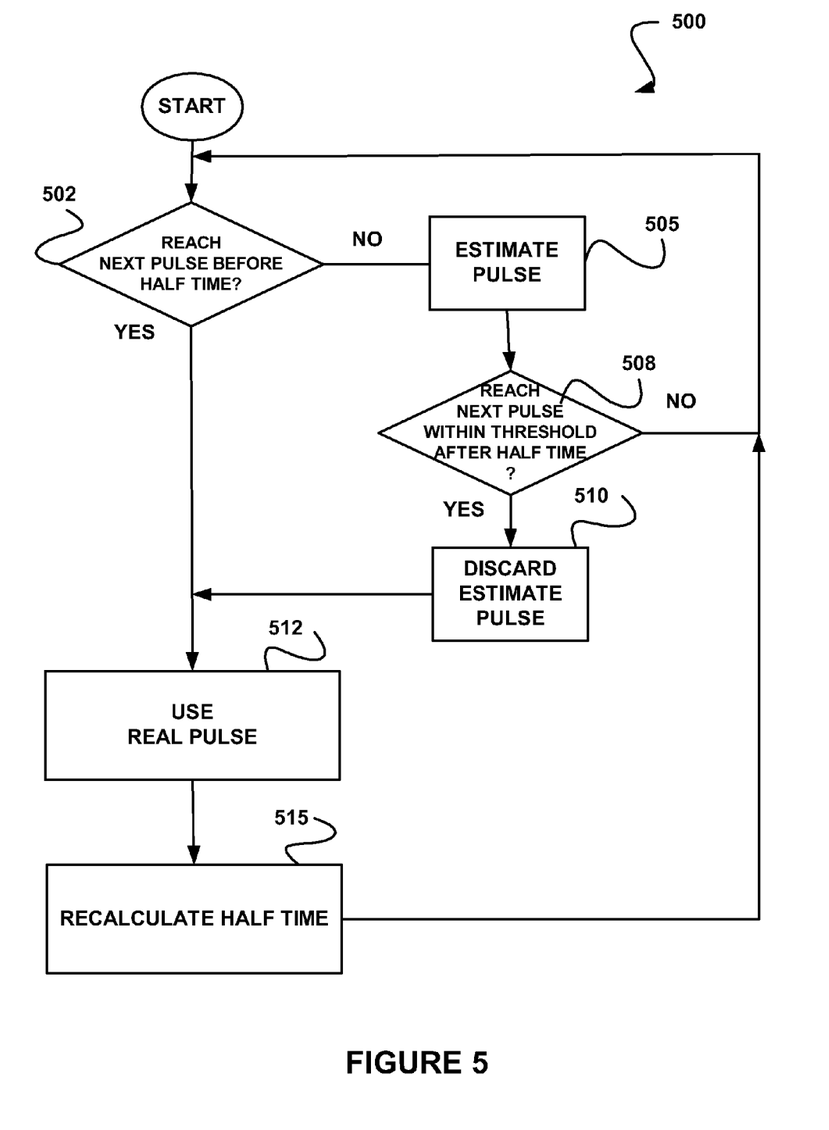
FIG. 5 shows a method for digitally estimating a clock signal of an audio signal, in accordance with another embodiment.

FIG. 5 shows a method 500 for digitally estimating a clock signal, in accordance with another embodiment. As an option, the method 500 may be used in the context of the system 200 of FIG. 2 or any other figures, for that matter. Of course, however, the method 500 may be used in any desired environment. Again, the aforementioned definitions may equally apply to the description below.

As shown, operation starts and iterates on decision 502, when it is determined whether a next pulse (e.g. see the pulse edges 402 of FIG. 4, etc.) has been reached before the termination of a predetermined duration (e.g. a half time as shown in FIG. 4, etc.). As an option, such determination may be made by monitoring an edge associated with such pulse. Further, the predetermined duration (e.g. half time, etc.) may be estimated based on a sample frequency of the audio signal which may be calculated in any desired manner (e.g. see FIG. 6, etc.).

It should be noted that decision 502 may occur at each cycle of a fast sampling clock (e.g. see sampling clock 408 of FIG. 4, etc.). If it is reached, such pulse may be used as a pulse of an estimated clock signal. See operation 512. Thereafter, the half time slot may be recalculated based on such real pulse, as set forth in operation 515. By continuously recalculating such half time based on real pulses, the present method 500 and, in particular, the decision 502, etc. may be tuned.

Various situations may exist where such pulse has not been reached before the termination of the predetermined duration. For example, the pulse being monitored may span 2 or 3 half time slots (e.g. see logic "0" and preamble of FIG. 4, etc.). Thus, if it is determined in decision 502 that such next pulse has not been reached, a next pulse of the estimated clock signal may be estimated. See operation 505. In one embodiment, the pulse may be positioned at the expected termination of the half time slot.

Thus, a component (e.g. pulse edge, etc.) of the estimated clock signal may be estimated if it is determined that a pulse has not occurred within the predetermined duration. Further, the pulse may simply be used as a component of the estimated clock signal if it is determined that the pulse has occurred within the predetermined duration.

However, situations may exist where the real pulse is received after one has been estimated (within a predetermined threshold). See decision 508. In other words, such real pulses may occur after the termination of the predetermined duration (e.g. half time, etc.). In such situations, the estimated pulse may be discarded in operation 510, and the real pulse may be used in operation 510.

Thus, in one embodiment, an audio reference clock may be recovered by sampling the audio signal using a much faster clock, which may already exists on a GPU for unrelated functionality. Through this sampling, one may dynamically determine the width of a smallest pulses in the audio signal, which are approximately a half-bit wide. Since each audio sample has 64 time slots, or 128 half-bit slots, the pulses generated at half time slots are essentially 128 times the audio frequency (128*fs-actual).

Since the smallest pulses are only approximately a half-bit wide, a self adjusting algorithm may hence be provided to generate an "average" half time slot pulse correctly over a long period of time. The self adjusting algorithm may use both edge detection and the determined smallest pulses together. Specifically, the smallest pulses may be used when there is no edge change in the case of 2*half time and 3*half time pulses, and such technique may self adjust when the edge occurs. Such approach may employ digital logic without necessarily using a codec and associated phase loop lock (PLL) for this purpose, and does not necessarily depend on the actual frequency, but only requires a system clock to be fast compared to 128*fs-actual.

Figure 6:
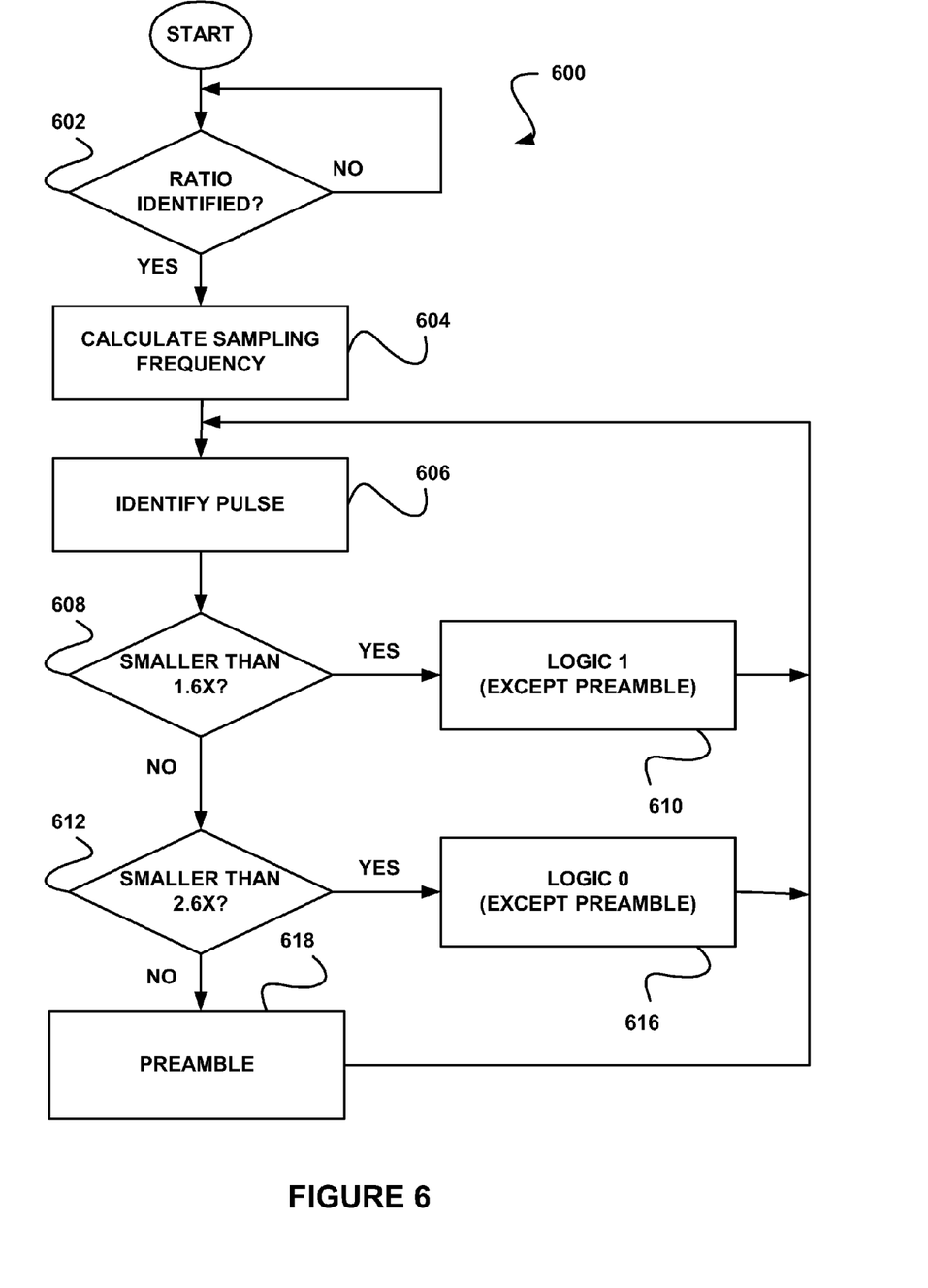
FIG. 6 shows a method for decoding an audio signal, in accordance with another embodiment.

FIG. 6 shows a method 600 for decoding an audio signal, in accordance with another embodiment. As an option, the method 600 may be used in the context of the system 200 of FIG. 2 or any other figures, for that matter. Of course, however, the method 600 may be used in any desired environment. Again, the aforementioned definitions may equally apply to the description below.

As shown, it may be determined whether a first pulse has a predetermined relative duration with respect to a second pulse. See decision 602. In one embodiment, such relative duration may include a 3-1 ratio. As noted during the description of FIG. 4, such ratio may be indicative of a preamble which may be used to calculate a sampling frequency fs. Similar to the decision 502 of FIG. 5, the decision 602 may occur at each cycle of a fast sampling clock (e.g. see sampling clock 408 of FIG. 4, etc.).

To this end, the sampling frequency fs may be conditionally calculated based on whether the first pulse has the predetermined relative duration with respect to the second pulse (and is thus assumed to be a preamble). See operation 604. In one embodiment, the sampling frequency may be calculated by summing a first duration of the first pulse and a second duration of the second pulse. To this end, the sampling frequency equals the sum of the first duration of the first pulse and the second duration of the second pulse.

With such sampling frequency fs, a time slot (as well as a half time slot) may be calculated using Equation #3.

$$\text{half time slot} = 1/((64*fs)*2) \qquad \text{Equation \#3}$$

With the half time slot calculated and a preamble identified, the audio signal may be decoded utilizing thresholds. Upon the identification of a pulse in operation 606, it may first be determined whether it is smaller than 1.5*half time. See decision 608. If so, it may be assumed that a transition has occurred indicating that a logic "1" is present. See operation 610.

On other hand, if the pulse is not smaller than 1.5*half time, it may be determined whether it is smaller than 2.5*half time. See decision 608. If so, it may be assumed that no transition has occurred within two half time slots indicating that a logic "0" is present. See operation 616.

If neither a logic "1" nor "0" is appropriate, it may be assumed that a preamble is present. See operation 618. It should be noted that the 1.5 and 2.5 factors may be programmably adjusted to reflect a desired tolerable error.

For example, any pulse that is smaller than a 1.5*half time slot may be assumed to be a 1*half time slot, which is indicative of a logic "1," with the exception of a preamble. Further, any pulse that is smaller than a 2.5*half time slot and larger than a 1.5*half time slot may be assumed to be 2*half time slots, which is indicative a logic "0," with the exception of the preamble. Finally, any pulse that is larger than a 2.5*half time slot may be assumed to be a 3*time slot, which is a preamble.

Thus, a digital approach is provided for decoding an audio signal without necessarily involving a codec and associated analog PLL which requires some PLL lock time during frequency change. Further, once the 3-1 pattern is detected and locked down, the data decode may tolerate up to 0.5*half time of jitter in some embodiments (which is 50% of 128*fs-actual).

Figure 7:
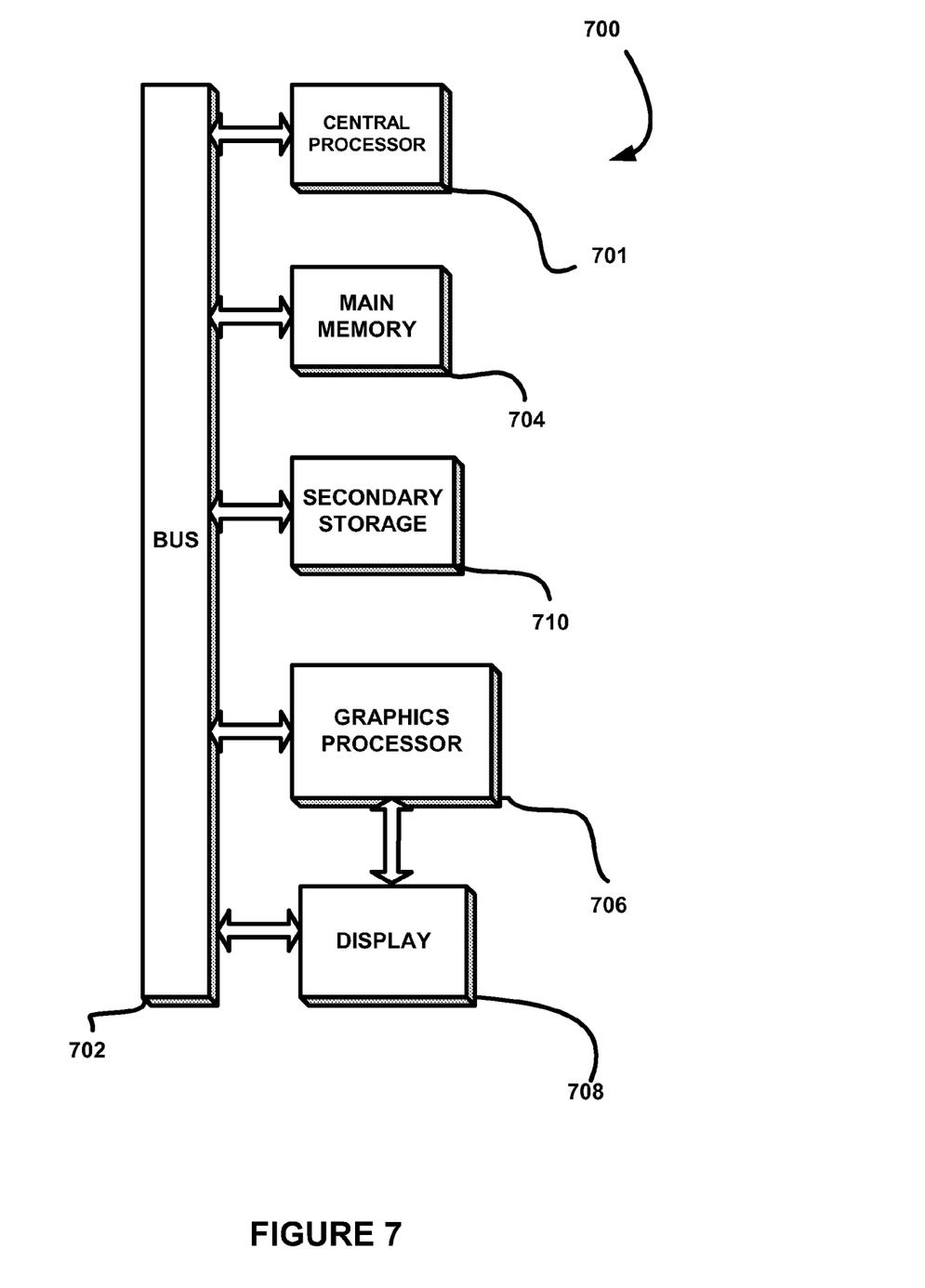
FIG. 7 illustrates an exemplary system in which the various architecture and/or functionality of different embodiments may be implemented, in accordance with one embodiment.

FIG. 7 illustrates an exemplary system 700 in which the various architecture and/or functionality of different embodiments may be implemented, in accordance with one embodiment. Of course, the system 700 may be employed in any desired environment.

As shown, the system 700 includes at least one central processor 701 which is connected to a communication bus 702. The system 700 also includes main memory 704 [e.g. random access memory (RAM), etc.].

The system 700 also includes a graphics processor 706 and a display 708. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor(s) 701, graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, a mobile system, and/or any other desired system, for that matter. Just by way of example, the system may include a desktop computer, notebook computer, hand-held computer, mobile phone, personal digital assistant (PDA), peripheral (e.g. printer, etc.), any component of a computer, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving an audio signal; and
   digitally estimating a clock signal associated with the audio signal;
   wherein the estimating includes determining whether a pulse has occurred within a predetermined duration;
   wherein the estimating includes estimating a component of the estimated clock signal if it is determined that the pulse has not occurred within the predetermined duration.

2. The method of claim 1, wherein the audio signal includes a biphase signal.

3. The method of claim 1, wherein the clock signal is estimated utilizing a graphics processor.

4. The method of claim 1, wherein the clock signal is estimated for encoding the audio signal.

5. The method of claim 4, wherein the audio signal is encoded as a high definition multimedia interface signal.

6. The method of claim 5, wherein the clock signal is estimated for generating a compliance test specification signal.

7. The method of claim 1, wherein extraction of an audio clock signal from the audio signal is avoided.

8. The method of claim 1, wherein the determining occurs based on another clock signal.

9. The method of claim 8, wherein the other clock signal is received from a graphics processor.

10. The method of claim a 1, wherein the estimating includes using the pulse as a component of the estimated clock signal if it is determined that the pulse has occurred within the predetermined duration.

11. The method of claim 10, wherein the estimating includes recalculating the predetermined duration based on the pulse.

12. The method of claim 1, wherein the estimating includes determining whether the pulse has occurred after the predetermined duration.

13. The method of claim 12, wherein the estimating includes discarding the estimated component if it is determined that the pulse has occurred after the predetermined duration.

14. The method of claim 13, wherein the estimating includes using the pulse as the component of the estimated clock signal if it is determined that the pulse has occurred after the predetermined duration.

15. A computer program product embodied on a computer readable medium, comprising:
   computer code for digitally estimating a clock signal associated with an audio signal;
   wherein the computer code is operable such that the estimating includes determining whether a pulse has occurred within a predetermined duration;
   wherein the computer code is operable such that the estimating includes estimating a component of the estimated clock signal if it is determined that the pulse has not occurred within the predetermined duration.

16. A system, comprising:
   an encoder for digitally estimating a clock signal associated with an audio signal;
   wherein the encoder is operable such that the estimating includes determining whether a pulse has occurred within a predetermined duration;
   wherein the encoder is operable such that the estimating includes estimating a component of the estimated clock signal if it is determined that the pulse has not occurred within the predetermined duration.

17. The system as recited in claim 16, wherein the encoder is a component of a graphics processor.

18. The system as recited in claim 17, wherein the graphics processor is in communication with a central processing unit via a bus.

* * * * *

UNITED STATES PATENT AND TRADEMARK OFFICE
CERTIFICATE OF CORRECTION

PATENT NO. : 7,924,181 B1  Page 1 of 1
APPLICATION NO. : 11/551557
DATED : April 12, 2011
INVENTOR(S) : Lam et al.

It is certified that error appears in the above-identified patent and that said Letters Patent is hereby corrected as shown below:

Col. 8, line 12, please replace "claim a 1" with --claim 1--.

Signed and Sealed this
Sixth Day of September, 2011

David J. Kappos
*Director of the United States Patent and Trademark Office*